United States Patent [19]

McCoskey et al.

[11] Patent Number: 5,041,251
[45] Date of Patent: Aug. 20, 1991

[54] POURABLE PARTICLES OF NORMALLY TACKY PLASTIC MATERIALS AND PROCESS FOR THEIR PREPARATION

[75] Inventors: Steven L. McCoskey; Stephen R. Hooker, both of Longview; Don W. Jarrell, Henderson; Marc S. Somers; Stephen W. Coe, both of Longview, all of Tex.

[73] Assignee: Eastman Kodak Company, Rochester, N.Y.

[21] Appl. No.: 385,838

[22] Filed: Jul. 27, 1989

[51] Int. Cl.$^5$ .............................................. B05D 7/02
[52] U.S. Cl. .................... 264/130; 264/131; 264/141; 264/142; 427/180; 427/430.1
[58] Field of Search ..................... 264/142, 7, 14, 141, 264/130, 131; 427/180, 430.1

[56] References Cited

U.S. PATENT DOCUMENTS

| | | | |
|---|---|---|---|
| 2,935,763 | 5/1960 | Newman et al. | 18/55 |
| 3,528,841 | 9/1970 | Donaldson et al. | 117/16 |
| 3,646,184 | 2/1972 | Nagne et al. | 264/144 |
| 3,791,913 | 2/1974 | Ver Strate et al. | 161/164 |
| 3,846,365 | 11/1974 | Berg et al. | 260/33.6 AQ |
| 3,927,166 | 12/1975 | Tomada et al. | 264/144 |
| 4,256,785 | 3/1981 | Dannelly | 427/222 |
| 4,359,492 | 11/1982 | Schlademan | 427/222 |
| 4,569,810 | 2/1986 | Oriot et al. | 264/142 |
| 4,663,099 | 5/1987 | Marven | 264/142 |

FOREIGN PATENT DOCUMENTS

| | | |
|---|---|---|
| 0281268 | 9/1988 | European Pat. Off. . |
| 0258333 | 7/1988 | German Democratic Rep. ......... 264/142 |
| 1345811 | 2/1974 | United Kingdom . |
| 1362870 | 8/1974 | United Kingdom . |
| 2202539 | 9/1988 | United Kingdom . |

Primary Examiner—Hubert C. Lorin
Attorney, Agent, or Firm—Mark A. Montgomery; William P. Heath, Jr.

[57] ABSTRACT

Pourable particles of normally soft and tacky plastic materials are formed by extruding the molten plastic material into contact with a cooling fluid containing a non-sticky material that is compatible with the plastic material, cutting the plastic material into particles, separating these particles from the cooling fluid, and contacting these particles with a second compatible non-sticky material.

21 Claims, 1 Drawing Sheet

POURABLE PARTICLES OF NORMALLY TACKY PLASTIC MATERIALS AND PROCESS FOR THEIR PREPARATION

BACKGROUND OF THE INVENTION

This invention relates to the preparation of finely divided free flowing polymeric particles made from normally tacky plastic materials such as amorphous polyolefins and adhesives based thereon.

Polymeric materials are produced, sold and handled in many different forms. However, the particulate form of these polymeric materials is generally a more preferred form. Generally the particulate form of polymeric material is easily produced at high rates and is preferred by most users due to ease in handling, shipping and processability. Therefore, it is generally desirable when producing polymer materials to end up with a commodity or form of material that is widely accepted in the industry such as particles or pellets. These particles or pellets are generally produced by extruding the polymer material in molten state through a die followed by cutting. Sometimes the die is immersed in water to solidify the pellets more quickly, such as in an underwater pelletizer.

Certain polymeric materials produce particles or pellets that are inherently tacky and the recovery from the manufacturing process in the form of usable pellets is extremely difficult. One method of reducing the tackiness of these particles is to coat them with a small amount of a non-sticky material, such as a powdered solid. Several different methods of coating these particles with the powdered material have been developed. One method is to simply mix the formed polymer particles with the powder by agitation, e.g. tumbling, airveying, etc. A more sophisticated process is strand pelletizing, in which the material is extruded into strands that are then dusted with the non-sticky powdered solid followed by cutting the strands into pellets.

It has been found that certain polymeric compounds that are inherently "soft and tacky" such as certain amorphous polyolefins and adhesives based thereon are extremely difficult to process into the form of usable pellets by conventional pelletization methods. These materials generally have a low degree of crystallinity and solidify slowly. These materials will either gum up or smear on the rotary knives of a pelletizer, plug the conveying lines, or block after being stored for a short period of time, particularly at elevated temperatures, and are not free flowing. These materials must then be produced and sold in some other less desirable form, such as large solid blocks or powder coated slats. It would, therefore, be desirable if a process could be developed to produce free flowing particles of these soft and tacky materials.

SUMMARY OF THE INVENTION

According to the present invention pourable free flowing particles of a normally soft and tacky plastic material are produced by first extruding and cutting the plastic material into particles while in contact with a fluid containing a compatible non-sticky material that coats the plastic particles as they are produced. The coated plastic particles are then separated from the cooling fluid and coated a second time with a non-sticky material, thereby producing pourable free flowing particles of the plastic material.

DETAILED DESCRIPTION OF THE INVENTION

Figure 1:
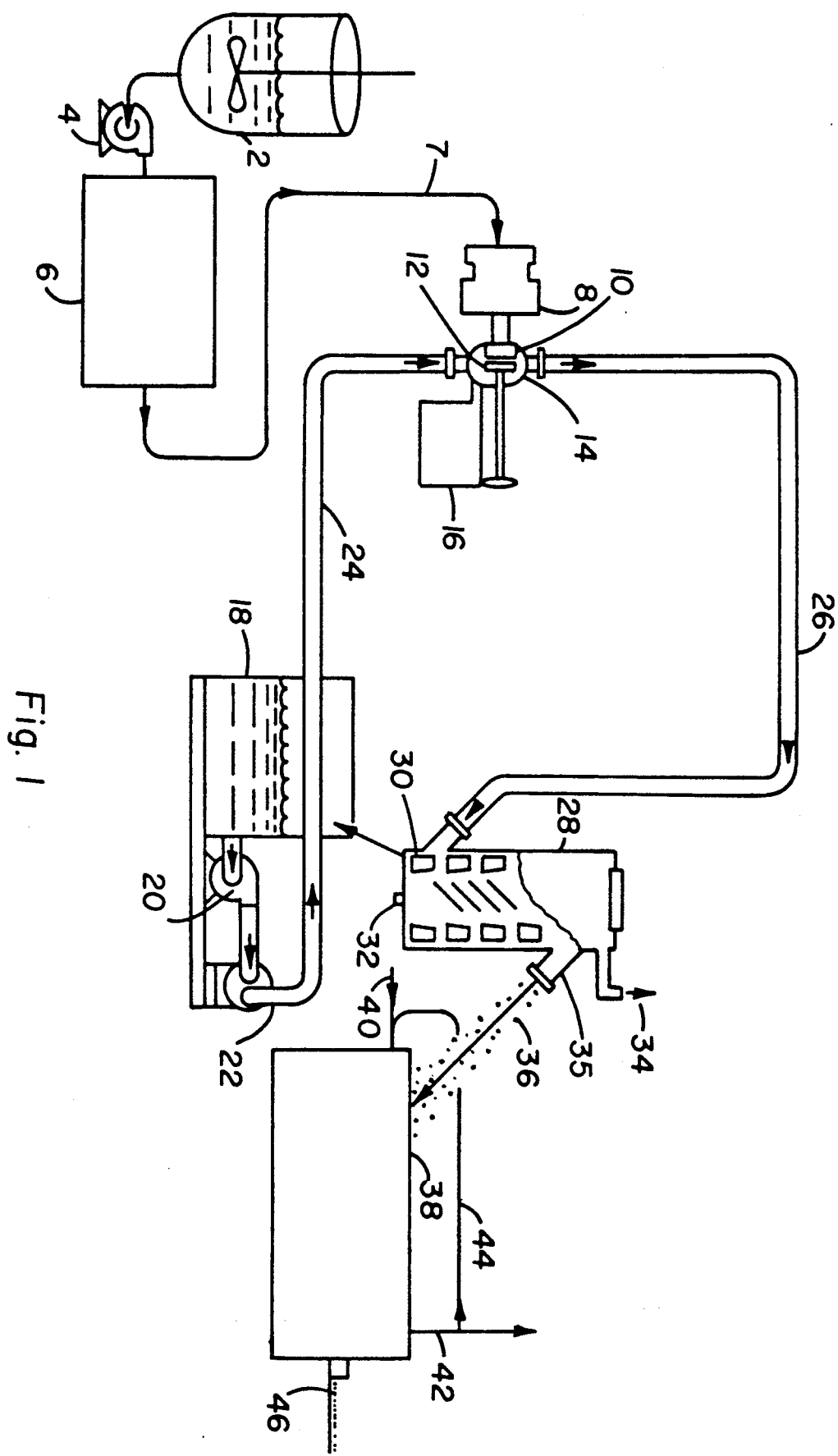
FIG. 1 is a diagram of a pelletization process within the scope of the present invention.

The method according to this invention comprises extruding a normally tacky plastic material through the orifice of a die plate that is immersed in a cooling fluid that contains a non-sticky material, cutting said plastic material as it is extruded while in contact with said cooling fluid to form particles coated with said non-sticky material, separating said particles from said cooling fluid, and then contacting said particles with a non-sticky material. The non-sticky material that is present in the cooling fluid and the non-sticky material that contacts the pellets after they have been separated from the cooling fluid should both be compatible with the plastic material. Both of these non-sticky materials can be the same non-sticky material.

The method according to the present invention for producing pourable particles of a normally tacky plastic material that is normally susceptible to blocking at temperatures encountered during storage conditions more specifically comprises:

(a) supplying said plastic material in extrudable form near the Ring and Ball Softening Point of said plastic material;

(b) extruding said plastic material through at least one orifice of a die plate immersed in a cooling fluid;

(c) cutting said plastic material as it exits said die plate while in contact with said cooling fluid thereby forming particles of said plastic material;

(d) separating said particles from said cooling fluid; and (e) contacting said particles with a non-sticky material that is compatible with said plastic material;

wherein said plastic material is also contacted with a non-sticky material that is compatible with said plastic material while in contact with said cooling fluid prior to said particles of said plastic material significantly contacting each other.

Applicants have discovered that certain polymeric materials that are inherently soft and tacky cannot be processed and formed into usable particles or pellets by conventional pelletization methods. Applicants have also found that it is not possible to produce usable particles of these plastic materials if they are contacted with a non-sticky material in a single step or process. These "soft and tacky" materials must first be pelletized in a process that cools and coats the particles as they are formed and cut prior to any significant particle to particle contact, such as in an underwater pelletizer in which a non-sticky material is present in the cooling water. If pelletization of these materials is attempted in a standard pelletizer, or in an underwater pelletizer without the presence of the non-sticky material in the water, these materials gum up or smear on the rotary knives and surface of the die or block after production. These "soft and tacky" pellets must then be contacted a second time with a non-sticky material, after being separated from any cooling fluid. If particles are formed from the soft and tacky materials according to the present invention, excluding the second contacting of the particles with the non-sticky material, the particles are not pourable and block after setting for a short period of time, particularly at elevated temperatures.

FIG. 1 depicts a pelletization process employing the two separate non-sticky contacting steps within the scope of the present invention. Molten polymer is pumped from the heated tank 2 by the positive displacement gear pump 4 through heat exchanger 6 and is cooled to near the Ring and Ball Softening Point of the polymer. The cooled polymer continues to flow through line 7, passes through heated adaptors 8 (to maintain the temperature of the polymer if needed) and then is extruded through the die 10.

Cooling water, containing the non-sticky powdered material, is pumped from the water reservoir 18 by the centrifugal pump 20 and then passes through heat exchanger 22 to further chill the water. The chilled water flows through line 24 passing through the cutting chamber 14 which contains the die 10 and cutting knives 12. The cutting knives 12 are driven by an underwater pelletizer 16.

The polymer comes in contact with the chilled water and powdered material after leaving the die 10 and is cut into particles by the rotating cutting knives 14. The cut particles and chilled water are then carried overhead through line 26 into the centrifugal dryer 28. The water is thrown through the screen 30 and is returned to the water reservoir 18. The polymer particles are carried up the dryer 28 by the rotor 32 and exit the dryer through the discharge chute 35. Air enters the dryer through discharge chute 35 and exits the dryer through vent 34.

Polymer particles 36 and powder 40 enter the powder dusting dedusting apparatus 38 (duster/deduster). The polymer particles are coated with powder and exit the duster/deduster via line 46. The excess powder exits the duster/deduster via line 42 and may be recycled through the duster/deduster via line 44.

The process of the present invention processes a normally soft and tacky polymer material into pourable free-flowing particles that do not block. By "pourable free-flowing" it is meant that the coated particles will flow through a funnel and yield a pourability value (according to ASTM D1895 Method B) both initially and after elevated temperature storage, preferably an initial pourability value of less than 2 seconds. By block it is meant that the particles will stick to one another by exertion of pressure, by being exposed to elevated temperatures, or a combination of both.

Most polymer materials (polymers and polymer containing materials) could be pelletized according to the process of the present invention as long as they are not extremely brittle when solidified. However, those polymer materials that are truly benefited by the present invention are those materials that are tacky at room temperature or at higher temperatures encountered during storage and thus have a tendency to block.

The materials that are most benefited by the present invention and thus are the preferred polymer materials used herein are those "soft and tacky" materials that cannot be formed into particles by conventional methods. These preferred materials are generally adhesives and adhesive polymers that have a low viscosity and a low degree of crystallinity and solidify slowly. These soft and tacky materials generally have a Ring and Ball Softening Point between about 80° C. and 160° C. according to ASTM E28 and a Brookfield Thermosel Viscosity between about 200 and 60,000 centipoise (cP) at 190° C. according to ASTM D3236. These "soft and tacky" materials preferably have a Ring and Ball Softening Point between about 85° C. and 140° C., a viscosity between about 500 and 20,000 cp at 190° C., and a glass transition temperature (Tg) below 0° C. according to ASTM D3418. These soft and tacky materials will also either have no peak melting temperature (Tm), or they will have a heat energy required to melt ($\Delta Hf$) of less than 50 Joules per gram (both according to ASTM D3418).

The more preferred materials pelletized according to the present invention are amorphous polyolefins and adhesives based thereon. The amorphous polyolefins include for example amorphous poly-alpha-olefins, amorphous copolymers and terpolymers. The most preferred amorphous polyolefins are amorphous polypropylene and amorphous copolymers of propylene and at least one other alpha olefin such as ethylene, 1-butene, and 1-hexene.

Such soft and tacky amorphous polyolefins are disclosed in U.S. Pat. No. 3,954,697 and U.S. Pat. No. 3,923,758. The disclosures of which are incorporated herein by reference in their entirety. The general procedure for preparing these polyolefins is as follows: Alpha olefin feedstocks are polymerized using an anionic coordination catalyst in a pressurized vessel at elevated temperatures. Hydrogen may be metered in to control molecular weight of the polyolefin.

The plastic material supplied to the process of the present invention is generally in extrudable form near the Ring and Ball Softening Point of the plastic material. It is generally preferred, however, that the plastic material be in molten form above the Ring and Ball Softening Point and be cooled down to about the Ring and Ball Softening Point of the plastic material just prior to extrusion. It is preferred that the temperature of the plastic material, as it commences extrusion, be no more than about 10° C. above the Ring and Ball Softening Point of the plastic material. The plastic material is preferably cooled in a heat exchanger as low as possible without producing any significant pressure drop across the heat exchanger.

Certain materials such as amorphous polyolefins that have a very low viscosity and are less likely to plug the heat exchanger. Therefore, just prior to extrusion, these materials are preferably cooled to a temperature significantly below their Ring and Ball Softening Point to aid in the forming the solid particles. These materials can be cooled down to about 20° C. or 30° C. below their Ring and Ball Softening Point without producing a significant pressure drop across the heat exchanger.

There is also a correlation between other particle forming conditions such as the temperature of the cooling fluid and how near the plastic material is to its Ring and Ball Softening Point. The lower the temperature of the plastic material is below the Ring and Ball Softening Point the easier it is to produce solid particles and thus the temperature of the cooling fluid can be higher.

It is preferred that the extrusion and the cutting of the plastic material be conducted in an underwater pelletizer. Examples of suitable underwater pelletizers are found in U.S. Pat. Nos. 4,569,810 and 4,663,099, the disclosures of which are incorporated herein by reference in their entirety. The cooling water needs to be sufficiently cooled to solidify the material shortly after it is extruded through the die. It is preferred that the temperature of this cooling water be below about 15° C., more preferably below about 10° C.

It is contemplated that any conventional extruder operated under conventional conditions would be useful in the process of the present invention. The die hole size, extrusion speed, etc. are not deemed to be critical to the present invention. However, the die holes should be sufficiently small and the extrusion speed should be sufficiently slow so as to yield solid particles in combination with the temperatures of the plastic material and cooling fluid.

After the particles have been formed in the cooling fluid it is preferred that all of the cooling fluid be separated from the particles. When a liquid is the cooling fluid a drying step in generally required.

The non-sticky material present in the cooling fluid is to contact and coat the plastic particles as they are being produced or at least prior to any significant particle to particle contact occurs to avoid agglomeration. This non-sticky material should be compatible with the plastic material. By compatible it is meant that the non-sticky material in combination with the plastic material, when in molten state and in its end use, does not significantly affect the processing conditions or quality of the product. Non-sticky materials such as corn starch are not compatible with these plastic materials since they tend to char and darken the plastic material and are thus not desirable.

Examples of suitable non-sticky materials include powders, silicones, and surfactants. The preferred non-sticky materials are powders such as powdered polyolefins. More preferred powders are the powdered polyolefin waxes. Examples of suitable powdered polyolefin waxes include powdered polyethylene wax, powdered polypropylene wax, and powdered Fischer-Tropsch wax. The most preferred non-sticky material is powdered polyolefin wax, such as polyethylene wax, having a particle size between about 1 and 600 microns.

The first non-sticky material that is present in the cooling fluid and the second non-sticky material that is contacted with the particles after being separated from the cooling fluid can be the same or different. It is preferred that these non-sticky materials both be a powdered polyolefin wax. It is preferred, however, that the first powdered polyolefin wax present in the cooling fluid have a particle size ranging from about 5 to 200 microns with a mean value particle size below about 80 microns, with the second powdered polyolefin wax in the second contacting step having a particle size ranging from about 10 to 600 microns with a mean value particle size below about 250 microns.

The amount of non-sticky material present in the cooling fluid should be an amount sufficient to substantially coat the particles as they are produced but yet not sufficient to interfere with processing. When powder is the non-sticky material and water is the cooling fluid the amount of powder in the water is typically less than about 5% by weight of the water with about 1 to 2 weight percent powder being more preferred.

The amount of non-sticky material that is contacted with the particles after they have been separated from the cooling fluid should be an amount sufficient to significantly coat the particles. An excess amount of non-sticky material can be used in this second contacting step as long as the particles can be separated from the excess non-sticky material.

In this second contacting step it is preferred that the particles be contacted with an excess of a non-sticky powder followed by separating the particles from any excess powder that does not adhere to the particles and recovering pourable particles of the plastic material. It is preferred that the powder particle size be significantly smaller than the plastic particles to aid in ease of removing the powder. When powder is used as the non-sticky material in this second contacting step the amount should be between a slight excess up to any practical excess above what would adhere to the plastic particles. Twice as much powder as particles or even more is possible. However, a great excess of powder is not significantly beneficial and only increases the processing costs per particle produced since the particles contain no more than about 8 weight percent powder adhered thereto. Generally the final plastic particles contain about 1 to 4 weight percent powder. However, if smaller particle size powder is used then less powder is needed to thoroughly coat the particles, and the particles can contain as little as half a percent or so of powder.

After the particles have been "dried", prior to any significant particle-to-particle contact, it is preferred that the particles be contacted with an excess of a non-sticky powder while being agitated. This can be accomplished in a vibrating stirred blender or preferably in a vibrating fluidized bed. Excess powder can then be separated from the pellets by falling through a screen with holes smaller than the pellets or preferably removed by the fluidizing gas overhead. It is preferred that the second contacting of the particles with the non-sticky material be conducted as gently as possible since some plastic particles are quite soft and tend to smear if violently stirred. Therefore, the second contacting is preferably conducted under conditions in which the particles and powder are fluidized by an inert gas.

EXAMPLES

The following examples are to illustrate the present invention but should not be interpreted as a required limitation thereon.

EXAMPLE 1

Amorphous propylene-ethylene copolymer, containing about 86 weight percent propylene and about 14 weight percent ethylene having a Ring and Ball Softening Point of 137° C., no melting point, a Tg of about $-20°$ C., and a viscosity at 190° C. of 6,000 cP, was processed into a solid form having dimensions approximately $1'' \times \frac{3}{4}'' \times 1/16''$. These solid pieces of amorphous propylene ethylene were hand fed to a $2\frac{1}{2}''$ single screw extruder with a Length/Diameter (L/D) ratio of 30/1.

The amorphous propylene-ethylene was heated to a melt temperature of 110° C. and extruded through a die having four 0.11" die holes. The die was at a temperature of 98° C. and its face was immersed in cold water. As the extruded amorphous propylene-ethylene exited the die it was cut into particles by four rotating knives of an underwater pelletizer. The underwater pelletizer's water system contained 0.5% by volume of a silicone emulsion (Dow Corning 36 silicone emulsion). The water and silicone were cooled to 18° C. by ambient cooling water.

The amorphous propylene-ethylene particles were separated from the water and silicone by a centrifugal dryer. After leaving the dryer the pellets immediately stuck together in a box. The particles were then dusted by hand with a small amount of talc. (Supplied by Gouvenour Talc Company under the tradename Nytal 300 talc). This reduced blocking significantly, but the amorphous propylene-ethylene particles were not entirely free-flowing. NOTE: Anytime "about" is used in the examples for a measured number it means that the material was measured but not that specific lot. The true number for that measurement in that lot should be very close to the number given.

EXAMPLE 2 (Comparative to Example 7)

Amorphous polypropylene having a Ring and Ball Softening Point of about 155° C., no melting point, a Tg of about −10° C. and a viscosity at 190° C. of about 2,150 cP, was processed into a solid form having dimensions approximately 2"×¾"×⅛". These solid pieces of amorphous polypropylene were hand fed to a 3½" single screw extruder having an L/D ratio of 20/1.

The amorphous polypropylene was heated to a melt temperature of 108° C. and extruded through a die having two die holes 0.125" (3.175 mm). The die was at a temperature of 93° C. and its face was immersed in water. As the extruded amorphous polypropylene exited the die it was cut into small particles by an underwater pelletizer. The underwater pelletizer's water system contained city water cooled to 8° C. by a heat exchanger that was cooled by an ethylene glycol chilled water system.

The amorphous polypropylene particles were separated from the water by a centrifugal dryer. After leaving the dryer the particles passed through an ionizer, then through a curtain of polyethylene wax powder having a mean value particle size of about 90 microns and a particle size distribution between about 9 and 212 microns. The powder coated particles were caught in a self-opening sack. The amorphous polypropylene particles blocked while setting in the sack and were not free-flowing.

EXAMPLE 3 (Comparative)

Amorphous propylene-butene copolymer, containing about 53 weight percent propylene and about 47 weight percent butene having a Ring and Ball Softening Point of about 95° C., a melting point of about 75° C., a Tg of about −20° C., a ΔHf of about 20 Joules, and a viscosity at 190° C. of about 2,000 cP, was processed into a solid form having dimensions approximately 2"×¾"×⅛". These solid pieces were hand fed to a 3½" single screw extruder having an L/D ratio of 20/1.

The amorphous propylene-butene was heated to a melt temperature of 93° C. and extruded through a die. The die was at a temperature of 92° C. and its face was immersed in water. As the extruded amorphous propylene-butene exited the die it was cut into small particles by an underwater pelletizer. The underwater pelletizer's water system contained 800 ml of surfactant and 36 ml of a defoamer per about 40 gallons water. The water and surfactant were cooled to 8° C. by a heat exchanger that was cooled by an ethylene glycol chilled water system.

The amorphous propylene-butene particles were separated from the water and surfactant by a centrifugal dryer. After leaving said dryer the particles were collected in a drum. The particles blocked while setting in the drum and were not free-flowing.

EXAMPLE 4 (Comparative)

Amorphous propylene-hexene containing about 40% propylene and about 60% hexene, having a Ring and Ball Softening Point of about 125° C., no melting point, a Tg of about −25° C., and a viscosity at 190° C. of about 3,850 cP, was processed into a solid form having dimensions approximately 2"×¾"×⅛". These solid pieces were hand fed to a 3½" single screw extruder having an L/D ratio of 20/1.

The amorphous propylene-hexene was heated to a melt temperature of 116° C. and extruded through a die having two 0.125" (3.175 mm) die holes. The die was at a temperature of 93° C. and its face was immersed in water. As the extruded amorphous propylene-hexene exited the die it was cut into particles by four rotating knives of an underwater pelletizer. The underwater pelletizer's water system contained approximately 1% by weight of a micronized Fischer-Tropsch wax having a mean value particle size of about 35 microns and a particle size distribution between about 3 and 90 microns. The wax was dispersed throughout the water reservoir using a pneumatic stirrer. The water was cooled to 16° C. by a heat exchanger that was cooled by an ethylene glycol chilled water system.

The amorphous propylene-hexene particles were separated from the water and the majority of the micronized wax by a centrifugal dryer. The powder coated particles were caught in a drum, but blocked while setting in an air conditioned environment. The amorphous propylene-hexene particles were not free-flowing. Lab tests showed that the wax did not affect the physical properties of the amorphous propylene-hexene.

EXAMPLE 5 (Inventive)

Amorphous propylene-ethylene copolymer containing about 86 wt % propylene and about 14 wt % ethylene having a Ring and Ball Softening Point of about 135° C., a Tg of about −20° C. and a viscosity at 190° C. of about 6,000 cP was heated to 157° C. in a melt tank jacketed with hot oil. The molten amorphous propylene-ethylene was pumped to a heat exchanger using a positive displacement gear pump. The heat exchanger was cooled with ambient water. The molten copolymer was pumped through the heat exchanger and cooled to 120° C.

The cooled copolymer was extruded through a die having four 0.11" die holes. The die was at a temperature of 132° C. and its face was immersed in water. At this point the melt temperature of the polymer was 124° C. As the extruded amorphous propylene-ethylene exited the die it was cut into particles by four rotating knives of an underwater pelletizer. The underwater pelletizer's water system contained approximately 1% by weight of a polyethylene wax powder having a mean value particle size of about 60 microns and a particle size distribution between about 6 and 212 microns. The powder was dispersed in the water using a pneumatic stirrer that was mounted on the water reservoir. The water was cooled to 7° C. by a heat exchanger that was cooled by an ethylene glycol chilled water system.

The amorphous propylene-ethylene particles were separated from the water and the majority of the powder by a centrifugal dryer. After leaving the dryer the particles were free-flowing. However, if these particles were allowed to stand for several hours, particularly at elevated temperatures they could not resist blocking.

The particles were then directed into a vibrating paddle blender. The blender was fed approximately 1.5% by weight (based on the weight of the particles) of a polyethylene wax powder having a particle size distribution between about 6 and 600 microns. This powder was fed to the blender using a volumetric feeder. The blender worked very well in blending the powder with the amorphous propylene-ethylene particles. The particle/powder blend exited the blender into a box. These wax coated amorphous propylene-ethylene particles were free-flowing and could not be forced to block by exerting hand pressure.

EXAMPLE 6 (Inventive)

A hot melt adhesive based on an amorphous propylene-hexene copolymer containing about 66 wt % propylene and about 34 wt % hexene (containing about 50% copolymer, about 20%-liquid tackifier, about 4% polyethylene wax, about 26%-hydrocarbon tacky resin and about 0.5% antioxidant) having a Ring and Ball Softening Point of about 115° C., a melting point of about 110° C., a Tg of about −10° C., and a viscosity at 135° C. of about 7,000 cP was heated to 140° C. in a melt tank jacketed with hot oil. The molten adhesive was pumped from the melt tank by a gear pump to another gear pump that was controlled by a variable frequency controller. The valve on the recycle line to the melt tank was choked down in order to get a back pressure to the second gear pump. The second gear pump positively displaced the molten adhesive through the heat exchanger. The heat exchanger was cooled with ambient water. The hot melt adhesive left the heat exchanger at 120° C.

The cooled adhesive was extruded through a die having ten 0.11″ die holes. The die was at a temperature of 92° C. and its face was immersed in water. At this point the melt temperature of the hot melt adhesive was 120° C. As the extruded adhesive exited the die it was cut into particles by four rotating knives of an underwater pelletizer. The pelletizer's water system contained approximately 1% by weight of a polyethylene wax powder having a mean value particle size of about 60 microns and a particle size distribution between about 6 and 212 microns. The powder was dispersed in the water using a pneumatic stirrer that was mounted on the water reservoir. The water was cooled to 9° C. by a heat exchanger that was cooled by an ethylene glycol chilled water system.

The amorphous propylene-hexene based hot melt adhesive particles were separated from the water and the majority of the powder in a centrifugal dryer. At this point if the adhesive particles were allowed to sit for very long (over 2 hours or so) they would block. After leaving the dryer the particles were caught in a drum and dusted with polyethylene wax powder having a mean value particle size of about 60 and a particle size distribution between about 6 and 212 microns by stirring the mixture with a rod. The resulting powder coated hot melt adhesive particles were free-flowing and did not block while setting in the drum.

EXAMPLE 7 (Inventive)

Amorphous polypropylene having a Ring and Ball Softening Point of about 155° C., no melting point, a Tg of about −10° C., and a viscosity at 190° C. of about 2,150 cP was heated to 185° C. in a melt tank jacketed with hot oil. The molten amorphous polypropylene was pumped from the tank to a gear pump controlled by a variable frequency controller. The molten polymer was pumped through a heat exchanger and cooled to 116° C.

The cooled polymer was extruded through a die having two 0.125″ die holes. The die was at a temperature of 107° C. and its face was immersed in water. At this point the melt temperature of the polymer was 132° C. As the extruded amorphous polypropylene exited the die it was cut into particles by four rotating knives of an underwater pelletizer. The pelletizer's water system contained approximately 1.5% by weight of a polyethylene wax powder having a mean value particle size of about 60 microns and a particle size distribution from about 6 to 212 microns. The powder was dispersed in the water using a pneumatic stirrer mounted on the water reservoir. The water was cooled to 9° C. by a heat exchanger that was cooled by an ethylene glycol chilled water system.

The amorphous polypropylene particles were separated from the water and the majority of the powder by a centrifugal dryer. After leaving the dryer the particles were free-flowing. However, if these particles were allowed to stand for several hours, particularly at elevated temperatures they could not resist blocking. The particles were then caught in a drum and dusted with a polyethylene wax powder (having a mean value particle size of about 60 microns, and a particle size distribution between about 6 and 212 microns) by stirring the mixture with a rod. The resulting powder coated amorphous polypropylene particles were free-flowing and did not block while setting in the drum.

These polyethylene wax coated amorphous polypropylene particles were very free-flowing, yielding a pourability value of 1.1 seconds (according to ASTM D1895 Method B). The amorphous polypropylene particles made by this process remained free-flowing after two weeks at 120° F., yielding a pourability value of 72 seconds.

EXAMPLE 8 (Inventive)

Amorphous propylene-ethylene (∼86 wt % propylene and ∼14 wt % ethylene) having a Ring and Ball Softening Point of about 135° C., no melting point, a Tg of about −20° C., and a viscosity at 190° C. of about 2,150 cP was pelletized by the process cited in Example 6.

These powder coated amorphous particles were washed with water and dried by a fan. This was done to remove the majority of polyethylene powder on the surface of the particles. The amorphous propylene-ethylene particles were then similar to particles that exit the centrifugal dryer in the process cited in Examples 5-7.

A vibrating fluidized bed was charged with polyethylene powder (mean value particle size of about 60 microns, particle size distribution from about 6 to 212 microns) to an expanded depth of about 3″ while fluidized with nitrogen gas. Once the bed was expanded and stable, the amorphous propylene-ethylene particles were introduced into the powder bed by a hand scoop at varying rates. The pellets disappeared into the powder bed and were conveyed out the other side. The particles were thoroughly coated with powder. The powder coated particles could not be forced to block by exerting the maximum pressure that could be generated by hand. The pellets remained free-flowing.

The above washed amorphous propylene-ethylene particles and polyethylene wax powder were also mixed in this vibrating fluidized bed in two different concentration ratios (a) about one part powder and about ten parts amorphous particles by volume and (b) about two parts powder and about one part amorphous particles (powder in far excess). The fluidizing nitrogen gas removed the excess powder (powder that did not adhere to the surface of the amorphous particles) in both cases. Also, in both cases the pellets were removed and in no case could the amorphous propylene-ethylene particles be forced to block by exertion of hand pressure.

EXAMPLE 9

Amorphous propylene ethylene copolymer containing about 86 wt % ethylene, and about 14 wt % propylene having a Ring and Ball Softening Point of 140° C., no melting point, a Tg of about −20° C., and a viscosity at 190° C. of 5,000 cP was heated to 154° C. in a melt tank jacketed with hot oil. The molten amorphous propylene-ethylene was pumped to a heat exchanger using two positive displacement gear pumps in series. The heat exchanger was cooled with ambient water. The molten polymer was pumped through the heat exchanger and cooled to 120° C.

The cooled polymer was extruded through a die having six 0.11" die holes. The die temperature was 131° C. and its face was immersed in water. As the extruded amorphous propylene-ethylene exited the die it was cut into particles by four rotating knives of an underwater pelletizer. The pelletizer's water system contained approximately 1.5% by weight of a polyethylene wax powder having a mean value particle size of about 60 microns and a particle size distribution between about 6 and 212 microns. The powder was dispersed in the water using a pneumatic stirrer that was mounted on the water reservoir. The water was cooled to 6° C. by a heat exchanger that was cooled by an ethylene glycol chilled water system.

The amorphous propylene-ethylene particles were separated from the water and the majority of the powder by a centrifugal dryer. After leaving the dryer the particles were free-flowing. However, if these particles were allowed to set for several hours, particularly at elevated temperatures they could not resist blocking.

The particles were collected in a drum and dusted with a polyethylene wax powder having a mean value particle size of about 240 microns and a particle size distribution from about 25 to 600 microns. The powder and amorphous particles were stirred with a rod.

The polyethylene wax coated amorphous propylene-ethylene particles were very free-flowing. These particles had a pourability value of 1.2 seconds according to ASTM D1895 Method B. These amorphous propylene-ethylene particles were then conditioned for three months at 120° F. The powder coated particles remained free-flowing and yielded a pourability value of 267 seconds according to ASTM D1895 Method B.

While the present invention has been described in detail, variations and modifications can be made without departing from the reasonable scope thereof.

We claim:

1. A process for producing pourable particles of a plastic material that is normally susceptible to blocking at temperatures encountered during storage conditions comprising:
   (a) supplying said plastic material in extrudable form near the Ring and Ball Softening Point of said plastic material;
   (b) extruding said plastic material through at least one orifice of a die plate immersed in a cooling fluid;
   (c) cutting said plastic material as it exits said die plate while in contact with said cooling fluid thereby forming particles of said plastic material;
   (d) separating said particles from said cooling fluid; and
   (e) contacting said particles with a non-sticky material;

wherein said plastic material is also contacted with a non-sticky material while in contact with said cooling fluid prior to said particles of said plastic material significantly contacting each other.

2. The process according to claim 1 wherein said cooling fluid is water that contains said non-sticky material and said plastic material is coated with said non-sticky material as it is extruded through a plurality of die holes in said die plate.

3. The process according to claim 1 wherein said non-sticky material is a compatible non-sticky material selected from the group consisting of compatible powders, silicones, and surfactants; said cooling fluid is water below about 15° C.; and said particles are dried after being separated from said water.

4. The process according to claim 3 wherein said plastic material in step (b) is no more than 10° C. above said Ring and Ball Softening Point and the temperature of said water is below about 10° C.

5. The process according to claim 3 wherein said non-sticky material is selected from the following powders, powdered polyolefins and powdered polyolefin waxes having a particle size between about 1 and 600 microns.

6. The process according to claim 5 wherein said powdered polyolefins are selected from the following powdered polyethylene wax, powdered polypropylene wax and powdered Fischer-Tropsch wax.

7. The process according to claim 1 wherein said non-sticky material present in said cooling fluid is powdered polyolefin wax having a particle size ranging from about 5 to 200 microns and having a mean value particle size below about 80 microns and said non-sticky material of (e) is a powdered polyolefin wax having a particle size ranging from about 10 to 600 microns and having a mean value particle size below about 250 microns.

8. The process according to claim 1 wherein said plastic material is normally tacky at temperatures encountered during storage, has a Ring and Ball Softening Point between about 80° C. and 160° C., and has a viscosity between about 200 and 60,000 cP at 190° C.

9. The process according to claim 8 wherein said plastic material is normally tacky at about room temperature, has a low degree of crystallinity, solidifies slowly, has a Ring and Ball Softening Point between about 85° and 140° C., and has a viscosity between about 500 and 20,000 cP at 190° C.

10. The process according to claim 1 wherein said plastic material has a glass transition temperature below 0° C. and either has no peak melting temperature, or has a heat energy required to melt of less than 50 Joules per gram.

11. The process according to claim 1 wherein said plastic material is selected from amorphous polyolefins, adhesives based on amorphous polyolefins, and adhesives with a glass transition temperature below 0° C. and heat energy required to melt of less than 50 Joules per gram.

12. The process according to claim 11 wherein said amorphous polyolefins are selected from the following; amorphous poly-alpha-olefins and amorphous copolymers and terpolymers of propylene and at least one another alpha-olefin.

13. The process according to claim 11 wherein said amorphous polyolefins are selected from amorphous polypropylene, amorphous propylene/ethylene copolymers, amorphous propylene/butene copolymers and amorphous propylene/hexene copolymers.

14. The process according to claim 1 further comprising contact said particles in step (e) with an excess of powder, separating said particles from the excess powder and recovering pourable particles of said plastic material.

15. The process according to claim 14 wherein said powder is present in about 0.5 to 8 wt % of the polymer particles.

16. The process according to claim 1 further comprising prior to step (a), heating said plastic material to a molten state at least 10° above said Ring and Ball Softening Point and cooling said plastic material down to at least about said Ring and Ball Softening Point in step (b).

17. A process for producing pourable particles of a plastic material that is normally tacky at about room temperature comprising:
    (a) supplying said plastic material in a molten form above the Ring and Ball Softening Point of said plastic material;
    (b) cooling said plastic material down to about said Ring and Ball Softening Point;
    (c) extruding said plastic material through a plurality of die holes in a die plate immersed in water below about 15° C.;
    (d) contacting said plastic material with a non-sticky material as it exits said plurality of die holes while in contact with said water;
    (e) cutting said plastic material as it exits said plurality of die holes thereby forming particles of said plastic material;
    (f) separating said particles from said cooling fluid;
    (g) drying said particles; and
    (h) contacting said particles with a non-sticky material;
wherein said non-sticky material of (h) and (d) is the same or different and is compatible with said plastic material.

18. The process according to claim 17 wherein said non-sticky material of (d) and (h) is powdered polyolefin wax having a particle size between about 1 and 600 microns.

19. The process according to claim 17 wherein said plastic material has a low degree of crystallinity, solidifies slowly, has a Ring and Ball Softening Point between about 80° and 160° C., has a viscosity between about 200 and 60,000 cP at 190° C., has a glass transition temperature below 0° C., and either has no peak melting temperature, or has a heat energy required to melt of less than 50 Joules per gram.

20. A process for producing pourable particles of a plastic material that is normally tacky at about room temperature, solidifies slowly, and has a low degree of crystallinity comprising;
    (a) supplying said plastic material in a molten form above the Ring and Ball Softening Point of said plastic material to a heat exchanger;
    (b) cooling said plastic material down to about said Ring and Ball Softening Point;
    (c) extruding said plastic material through a die hole or a plurality of die holes in a die plate immersed in water that is chilled below about 15° C.;
    (d) contacting said plastic material with a non-sticky powder as it exits said die plate while in contact with said water;
    (e) cutting said plastic material as it exits said plurality of die holes thereby forming particles of said plastic material;
    (f) separating said particles from said water;
    (g) drying said particles;
    (h) contacting said particles with an excess of non-sticky powder, thereby further coating said particles;
    (i) separating said particles from the excess non-sticky powder; and
    (j) recovering pourable particles of said plastic material; wherein said non-sticky powder is substantially smaller than said plastic particles and is compatible with said plastic material when in a molten state and in an end use so as to not significantly affect the processing conditions or quality of the end use plastic material product.

21. The process according to claim 20 wherein said non-sticky powder is powdered polyethylene wax and said plastic material is selected from amorphous polyolefins and adhesives based thereon.

* * * * *